(12) United States Patent
Xu et al.

(10) Patent No.: US 10,928,936 B2
(45) Date of Patent: Feb. 23, 2021

(54) TOUCH DISPLAY SUBSTRATE WITH A CONDUCTIVE SHIELD LAYER AND METHOD FOR MANUFACTURING THE SAME, DISPLAY DEVICE AND METHOD FOR DRIVING THE SAME

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Shuai Xu, Beijing (CN); Yong Song, Beijing (CN); Zhiyong Wang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 33 days.

(21) Appl. No.: 16/029,173

(22) Filed: Jul. 6, 2018

(65) Prior Publication Data

US 2019/0204942 A1 Jul. 4, 2019

(30) Foreign Application Priority Data

Jan. 3, 2018 (CN) .......................... 201810004215.9

(51) Int. Cl.
*G06F 3/041* (2006.01)
*G06F 3/044* (2006.01)

(52) U.S. Cl.
CPC ............ *G06F 3/041* (2013.01); *G06F 3/0412* (2013.01); *G06F 3/0443* (2019.05); *G06F 3/0418* (2013.01); *G06F 2203/04103* (2013.01); *G06F 2203/04107* (2013.01)

(58) Field of Classification Search
CPC . G06F 2203/04103; G06F 2203/04107; G06F 3/041; G06F 3/0412; G06F 3/0418; G06F 3/0443
See application file for complete search history.

(56) References Cited

U.S. PATENT DOCUMENTS 9,851,824 B2 * 12/2017 Kida ..................... G06F 3/0412
2012/0262389 A1 10/2012 Kida et al.
2013/0093696 A1 * 4/2013 Huang .................... G06F 3/044
345/173

(Continued)

FOREIGN PATENT DOCUMENTS

CN 102736788 A 10/2012
CN 104252262 A 12/2014

(Continued)

OTHER PUBLICATIONS

First Office Action for Chinese Application No. 201810004215.9, dated Jun. 22, 2020, 7 Pages.

*Primary Examiner* — Ram A Mistry
(74) *Attorney, Agent, or Firm* — Brooks Kushman P.C.

(57) ABSTRACT

A touch display substrate includes a touch region, a non-touch region, a plurality of touch electrodes at the touch region, periphery wires at the non-touch region, and a conductive shield layer above the periphery wires. The conductive shield layer covers at least one of the periphery wires.

16 Claims, 2 Drawing Sheets

(56) References Cited

U.S. PATENT DOCUMENTS

| | | | | |
|---|---|---|---|---|
| 2013/0285972 | A1* | 10/2013 | Elias | G06F 3/044 |
| | | | | 345/174 |
| 2015/0002758 | A1* | 1/2015 | Chu | G06F 3/041 |
| | | | | 349/12 |
| 2015/0331530 | A1* | 11/2015 | Kim | G06F 3/0412 |
| | | | | 345/174 |
| 2016/0103359 | A1* | 4/2016 | Kimura | G02B 5/201 |
| | | | | 349/33 |

FOREIGN PATENT DOCUMENTS

| | | |
|---|---|---|
| CN | 106843616 A | 6/2017 |
| CN | 106908977 A | 6/2017 |
| CN | 206339950 U | 7/2017 |
| CN | 107346194 A | 11/2017 |

* cited by examiner

TOUCH DISPLAY SUBSTRATE WITH A CONDUCTIVE SHIELD LAYER AND METHOD FOR MANUFACTURING THE SAME, DISPLAY DEVICE AND METHOD FOR DRIVING THE SAME

CROSS-REFERENCE TO RELATED APPLICATION

This application claims priority to Chinese Patent Application No. 201810004215.9, filed on Jan. 3, 2018, which is incorporated herein by reference in its entirety.

TECHNICAL FIELD

The present disclosure relates to the field of display technology, and in particular to a touch display substrate and a method for manufacturing the same, a display device and a method for driving the same.

BACKGROUND

With development of display technology, display devices are widely used. A touch panel and a display panel may be integrated into one display device. When the display device is operated by a user, inputting or control operations may be performed directly by touching the display device. This makes the display device easy to use. However, precision of touch detection of the display device in the related art needs to be further improved.

In order to make the display device lighter and thinner, the research direction of embedding the touch panel function into the display panel (i.e., in-cell type display device) has gradually become the focus. However, precision of touch detection of the in-cell type display device needs to be further improved.

SUMMARY

One embodiment of the present disclosure provides a touch display substrate that includes a touch region, a non-touch region, a plurality of touch electrodes at the touch region, periphery wires at the non-touch region, and a conductive shield layer above the periphery wires. The conductive shield layer covers at least one of the periphery wires.

Optionally, the conductive shield layer covers all of the periphery wires.

Optionally, the touch display substrate further includes a driver chip at the non-touch region. The conductive shield layer is coupled to the driver chip.

Optionally, the touch display substrate further includes an insulation layer between the conductive shield layer and the periphery wires.

Optionally, the conductive shield layer and the touch electrodes are within an identical layer, and the conductive shield layer is spaced from the touch electrodes.

Optionally, the conductive shield layer extends along a periphery of the touch electrodes, and defines a U-shape.

Optionally, the touch electrodes are within the U-shape defined by the conductive shield layer.

One embodiment of the present disclosure provides a method for manufacturing a touch display substrate that includes a touch region, a non-touch region, a plurality of touch electrodes at the touch region and periphery wires at the non-touch region, the method including: forming a conductive shield layer above the periphery wires with the conductive shield layer covering at least one of the periphery wires.

Optionally, the forming a conductive shield layer above the periphery wires includes: forming the conductive shield layer and the touch electrodes through one patterning process.

Optionally, before the forming a conductive shield layer above the periphery wires, the method further includes: forming an insulation layer covering the periphery wires; and the forming a conductive shield layer above the periphery wires includes: forming the conductive shield layer and the touch electrodes at the insulation layer.

One embodiment of the present disclosure provides a display device including the above touch display substrate.

Optionally, the display device further includes a color substrate that is arranged opposite to the touch display substrate. The color substrate includes a base substrate, a black matrix at the base substrate and a color filter unit; there is an overlapping region between an orthographic projection of the black matrix to the base substrate and an orthographic projection of the periphery wires to the base substrate; and an orthographic projection of the conductive shield layer to the base substrate covers the whole overlapping region.

Optionally, the conductive shield layer covers all of the periphery wires.

Optionally, the display device further includes a driver chip at the non-touch region; wherein the conductive shield layer is coupled to the driver chip.

Optionally, the display device further includes an insulation layer between the conductive shield layer and the periphery wires.

Optionally, the conductive shield layer and the touch electrodes are within an identical layer, and the conductive shield layer is spaced from the touch electrodes.

Optionally, the conductive shield layer extends along a periphery of the touch electrodes, and defines a U-shape.

Optionally, the touch electrodes are within the U-shape defined by the conductive shield layer.

One embodiment of the present disclosure provides a method for driving the above display device. The method includes: when the display device works in a touch period, simultaneously supplying a touch drive signal to the touch electrodes and the conductive shield layer.

Optionally, the method includes: when the display device works in a display period, simultaneously supplying a common voltage signal to the touch electrodes and the conductive shield layer.

BRIEF DESCRIPTION OF THE DRAWINGS

A brief introduction will be given hereinafter to the accompanying drawings which will be used in the description of the embodiments in order to explain the embodiments of the present disclosure more clearly. Apparently, the drawings in the description below are merely for illustrating some embodiments of the present disclosure. Those skilled in the art may obtain other drawings according to these drawings without paying any creative labor.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise indicated. The following description of exemplary embodiments is merely used to illustrate the present disclosure and is not to be construed as limiting the present disclosure.

In an in-cell type display device, a transparent conductive electrode is provided at a touch display substrate. The transparent conductive electrode may be used in a display period and in a touch period in time division multiplexing way. For example, in the display period, the transparent conductive electrode may be used as a common electrode; and in the touch period, the transparent conductive electrode may be re-used as a touch electrode.

Figure 1:
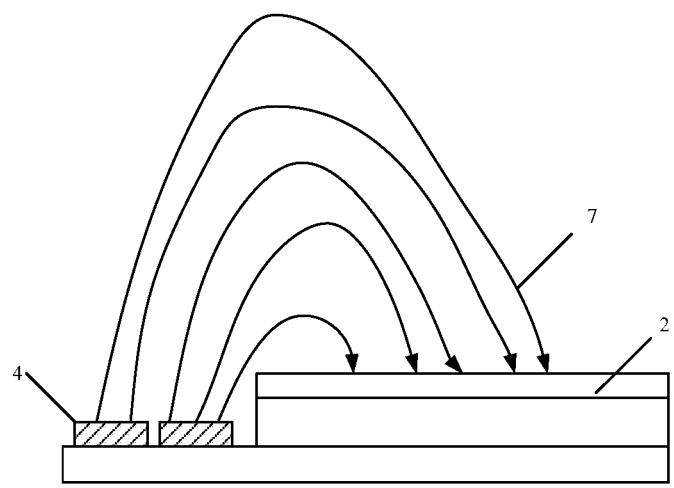
FIG. 1 is a schematic view showing that touch electrodes are affected by a periphery circuit in the related art.

A periphery circuit is disposed at a non-touch region of the touch display substrate. The periphery circuit includes a variety of periphery wires. These periphery wires may include a GND wire for conducting static electricity and driver signal wires. When the display device works, a driver chip can realize drive control of the display device through the periphery wires and the static electricity generated during work can be discharged through the periphery wires, thereby keeping normal operation of the display device. However, since these periphery wires are close to touch electrodes at a periphery of a touch region of the touch display substrate, when the display device works in the touch period, as shown in FIG. 1, an electrical signal of a touch electrode 2 at a periphery of a touch region may be pulled by an electrical signal of a peripheral circuit 4, then a touch signal of the touch electrode may be affected and then precision of touch detection is affected. In FIG. 1, the reference number 7 represents electric field lines.

In order to solve the above problem, one embodiment of the present disclosure provides a touch display substrate and a method for manufacturing the same, a display device and a method for driving the same, which can improve precision of touch detection.

One embodiment of the present disclosure provides a touch display substrate. The touch display substrate includes a touch region, a non-touch region, a plurality of touch electrodes at the touch region, periphery wires at the non-touch region, and a conductive shield layer above the periphery wires. The conductive shield layer covers at least one of the periphery wires.

In this embodiment, the conductive shield layer is provided above the periphery wires and covers the periphery wires, thereby shielding electrical signals of the periphery wires and then preventing the electrical signals of the periphery wires from affecting the surroundings. Thus, the electrical signals of the periphery wires cannot pull an electrical signal of one touch electrode at a periphery of the touch region, and also cannot affect electrical signals of the touch electrodes at an inner area of the touch region, thereby ensuring accuracy of sensing of signals of the touch electrodes in the touch region, ensuring stability of touch performance and improving precision of touch detection. Optionally, the conductive shield layer covers all of the periphery wires.

Optionally, the touch display substrate further includes a driver chip at the non-touch region. The conductive shield layer is coupled to the driver chip. The driver chip can supply an electrical signal to the conductive shield layer, thereby enabling the conductive shield layer to shield the electrical signals of the periphery wires and then prevent the electrical signals of the periphery wires from affecting the surroundings. Specifically, in a touch period, the driver chip may supply a touch drive signal to the conductive shield layer. Of course, the driver chip may supply other electrical signal to the conductive shield layer, as long as the conductive shield layer can shield the electrical signals of the periphery wires and then prevent the electrical signals of the periphery wires from affecting the surroundings.

Optionally, as the conductive shield layer is conductive, in order to prevent the conductive shield layer from affecting the electrical signals transmitted in the periphery wires, an insulation layer may be disposed between the conductive shield layer and the periphery wires. The presence of the insulation layer enables the conductive shield layer to be insulated from the periphery wires. The insulation layer may be made of organic materials such as organic resin, or inorganic materials such as oxides, nitrides, or oxynitrides. Specifically, after formation of the periphery wires, the insulation layer may be prepared and covers the periphery layer, and then the conductive shield layer is formed above the insulation layer.

Figure 2:
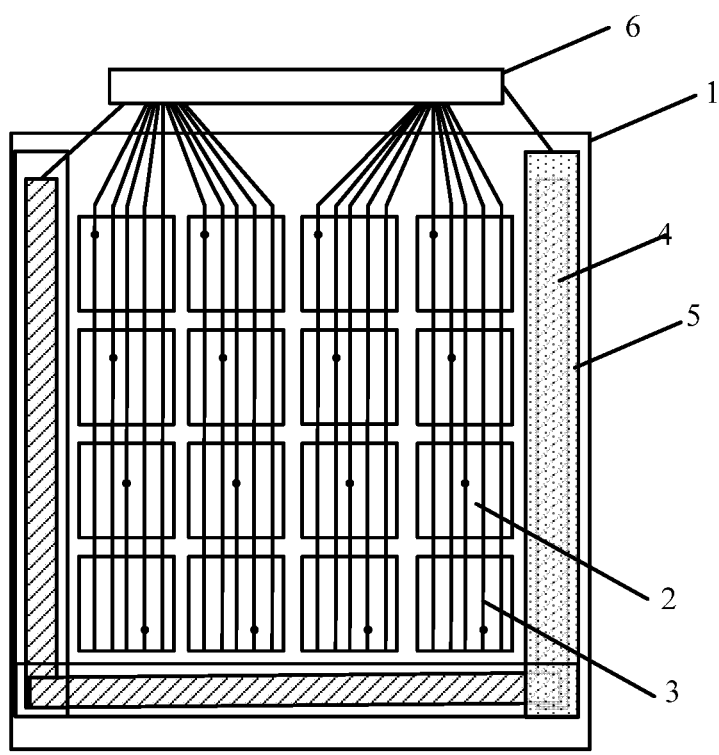
FIG. 2 is a schematic view of a touch display substrate according to an embodiment of the present disclosure.

FIG. 2 is a schematic view of a touch display substrate according to an embodiment of the present disclosure. As shown in FIG. 2, the touch display substrate 1 includes a touch region, a non-touch region, and a plurality of touch electrodes 2 at the touch region. Specifically, the touch electrodes 2 are self-capacitance electrodes, and may be re-used as common electrodes. The touch electrodes 2 are coupled to a driver chip 6 through touch signal lines 3. In a touch period, the driver chip 6 supplies a touch drive signal to the touch electrodes 2 through the touch signal lines 3. In a display period, the driver chip 6 supplies a common voltage signal to the touch electrodes through the touch signal lines 3. When the touch electrodes 2 are re-used as the common electrodes, structures of the touch display substrate can be simplified, and a thickness of the touch display substrate can be reduced.

As shown in FIG. 2, there is a periphery circuit 4 at the non-touch region. The periphery circuit 4 includes periphery wires for transmitting electrical signals. Optionally, the touch display substrate may further include a conductive shield layer 5 above the periphery wires. The conductive shield layer covers at least one of the periphery wires. In other words, an orthographic projection of the conductive shield layer 5 to the touch display substrate and an orthographic projection of the periphery wires to the touch display substrate at least partially overlap with each other.

Optionally, in order to shield the electrical signals of the periphery wires to the maximum extent and then prevent the electrical signals of the periphery wires from affecting the surroundings, the conductive shield layer 5 covers all of the periphery wires. In other words, the orthographic projection of the periphery wires to the touch display substrate is completely within the orthographic projection of the conductive shield layer 5 to the touch display substrate.

Figure 3:
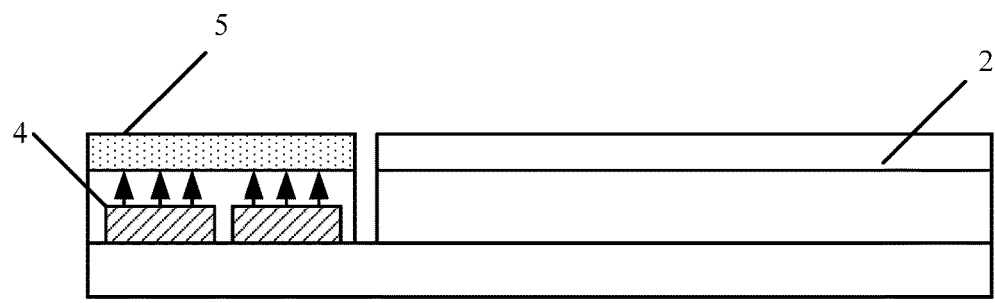
FIG. 3 is a schematic view showing that a conductive shield layer shields a periphery circuit according to an embodiment of the present disclosure.

As shown in FIG. 2 and FIG. 3, in the touch period, the conductive shield layer 5 above the periphery circuit 4 can shield the electrical signals of the periphery wires to the maximum extent and then prevent the electrical signals of the periphery wires from affecting the surroundings. Thus, the electrical signals of the periphery wires cannot pull an electrical signal of one touch electrode 2 at a periphery of the touch region, and also cannot affect electrical signals of the touch electrodes 2 at an inner area of the touch region, thereby ensuring accuracy of sensing of signals of the touch electrodes 2 in the touch region, ensuring stability of touch performance and improving precision of touch detection.

Optionally, the conductive shield layer 5 is coupled to the driver chip 6. In the touch period, the driver chip 6 may supply a touch drive signal to the conductive shield layer 5, thereby further ensuring accuracy of sensing of signals of the touch electrodes in the touch region, ensuring stability of touch performance and improving precision of touch detection. When the touch electrodes are re-used as common electrodes, in the display period, the driver chip 6 may supply a common voltage signal to the conductive shield layer 5, thereby shielding the electrical signals of the periphery wires and then preventing the electrical signals of the periphery wires from affecting the displaying.

One embodiment of the present disclosure further provides a method for manufacturing a touch display substrate. The touch display substrate includes a touch region, a non-touch region, a plurality of touch electrodes at the touch region, and periphery wires at the non-touch region. The method includes: forming a conductive shield layer above the periphery wires with the conductive shield layer covering at least one of the periphery wires.

In this embodiment, the conductive shield layer is provided above the periphery wires and the conductive shield layer is supplied with a touch drive signal in the touch period, thus the conductive shield layer can shield electrical signals of the periphery wires and then prevent the electrical signals of the periphery wires from affecting the surroundings. Then, the electrical signals of the periphery wires cannot pull an electrical signal of one touch electrode at a periphery of the touch region, and also cannot affect electrical signals of the touch electrodes at an inner area of the touch region, thereby ensuring accuracy of sensing of signals of the touch electrodes in the touch region, ensuring stability of touch performance and improving precision of touch detection. Optionally, the conductive shield layer covers all of the periphery wires.

Optionally, forming the conductive shield layer includes: forming the conductive shield layer and the touch electrodes through one patterning process. In this way, the number of patterning processes for the touch display substrate can be reduced, and then the production cost of the touch display substrate can be reduced.

Specifically, in one embodiment, the method may include the following steps.

Step 1 is to provide a base substrate, and form a display unit and a periphery circuit at the base substrate.

When the touch display substrate is applied to a liquid crystal display device, the display unit includes thin film transistors, pixel electrodes and signals lines, and the periphery circuit includes signal transmission lines for the touch display substrate. Specifically, in one embodiment, the display unit and the periphery circuit may be prepared by means of patterning process.

When the touch display substrate is applied to an OLED display device, the display unit includes thin film transistors and light emitting units, and the periphery circuit includes signal transmission lines for the touch display substrate. Specifically, in one embodiment, the display unit and the periphery circuit may be prepared by means of patterning process.

Step 2 is to form an insulation layer covering both of the display unit and the periphery unit.

Specifically, an insulation layer with a thickness of in a range of from 500 Å to 5000 Å may be deposited at the base substrate obtained after the step 1 by means of the plasma enhanced chemical vapor deposition (PECVD) method. The insulation layer may be made of organic materials such as organic resin, or inorganic materials such as oxides, nitrides, or oxynitrides.

Step 3 is to form a conductive shield layer and touch electrodes at the insulation layer.

Specifically, the touch electrodes are self-capacitance electrodes. Since the touch electrodes are above the display unit, the conductive shield layer and the touch electrodes may be made of transparent conductive materials so as to not affect displaying.

Specifically, a transparent conductive layer with a thickness of in a range of from 300 Å to 1500 Å may be deposited at the insulation layer by means of sputtering or thermal evaporation. The transparent conductive layer may be made of ITO, IZO or other transparent metal oxide. Then, a layer of photoresist is coated on the transparent conductive layer, and then is exposed with a mask plate to form a photoresist unreserved region and a photoresist reserved region. The photoresist reserved region is corresponding to a region where a pattern of the touch electrodes and the conductive shield layer is. The photoresist unreserved region is corresponding to other region except for the above pattern. Developing treatment is performed to completely remove the photoresist at the photoresist unreserved region with a thickness of the photoresist at the photoresist reserved region unchanged. The transparent conductive layer at the photoresist unreserved region is completely removed by means of etching process. The remained photoresist is removed to form the pattern of the touch electrodes and the conductive shield layer. The touch electrodes and the conductive shield layer are simultaneously formed through one patterning process, and thus the number of patterning processes for the touch display substrate can be reduced and then the production cost of the touch display substrate can be reduced.

One embodiment of the present disclosure further provides a display device which includes the above display device. The display device may be any product or component having display function, such as a television, a monitor, a digital photo frame, a mobile phone, a tablet computer. The display device further includes a flexible circuit board, a printed circuit board and a back board.

In the display device of this embodiment, the conductive shield layer is provided above the periphery wires and the conductive shield layer is supplied with a touch drive signal in the touch period, thus the conductive shield layer can shield electrical signals of the periphery wires and then prevent the electrical signals of the periphery wires from affecting the surroundings. Then, the electrical signals of the periphery wires cannot pull an electrical signal of one touch electrode at a periphery of the touch region, and also cannot affect electrical signals of the touch electrodes at an inner area of the touch region, thereby ensuring accuracy of sensing of signals of the touch electrodes in the touch region, ensuring stability of touch performance and improving precision of touch detection.

Figure 4:
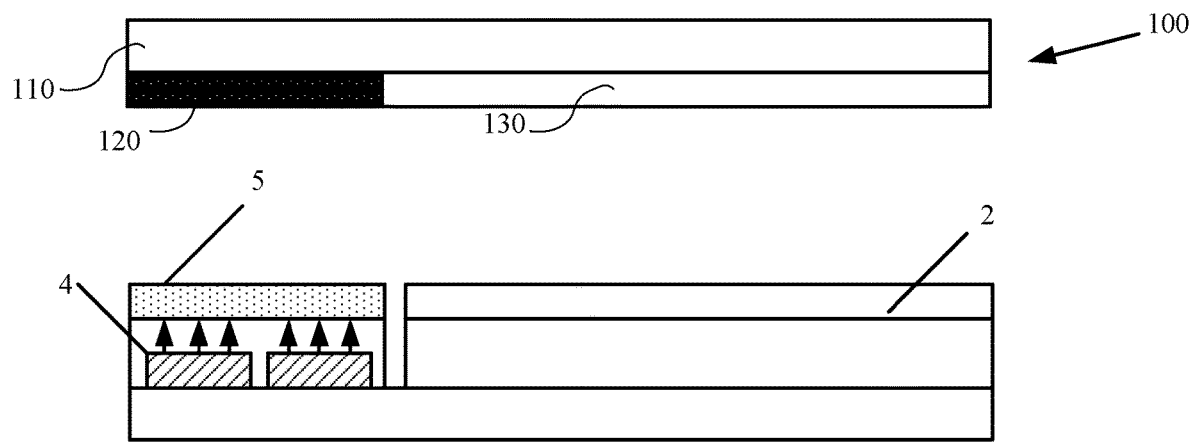
FIG. 4 is a schematic view of a display device according to an embodiment of the present disclosure.

Optionally, as shown in FIG. 4, the display device further includes a color substrate 100 which is arranged opposite to the touch display substrate. The color substrate includes a base substrate 110, a black matrix 120 at the base substrate 110 and a color filter unit 130. An orthographic projection of the black matrix to the base substrate and an orthographic projection of the periphery wires to the base substrate at least partially overlap with each other, and an orthographic projection of the conductive shield layer to the base substrate covers an entire overlapping region between the orthographic projection of the black matrix to the base substrate and then orthographic projection of the periphery wires to the base substrate. In this way, the presence of the conductive shield layer can avoid generation of parasitic capacitance between the periphery wires and the black matrix, and prevent the periphery wires from being coupled to the capacitance between the black matrix and the touch electrodes, thereby enabling electrical signals of the periphery wires to not affect electrical signals of the touch electrodes, and then ensuring stability of touch performance and improving precision of touch detection.

One embodiment of the present disclosure further provides a method for driving a display device, which may be applied to the above display device. The method includes: when the display device works in a touch period, simultaneously supplying a touch drive signal to the touch electrodes and the conductive shield layer.

In this embodiment, the conductive shield layer is provided above the periphery wires and the conductive shield layer is supplied with a touch drive signal in the touch period, thus the conductive shield layer can shield electrical signals of the periphery wires and then prevent the electrical signals of the periphery wires from affecting the surroundings. Then, the electrical signals of the periphery wires cannot pull an electrical signal of one touch electrode at a periphery of the touch region, and also cannot affect electrical signals of the touch electrodes at an inner area of the touch region, thereby ensuring accuracy of sensing of signals of the touch electrodes in the touch region, ensuring stability of touch performance and improving precision of touch detection. Optionally, the conductive shield layer covers all of the periphery wires.

Of course, the driver chip may supply other electrical signal to the conductive shield layer, as long as the conductive shield layer can shield the electrical signals of the periphery wires and then prevent the electrical signals of the periphery wires from affecting the surroundings.

In order to simplify structures of the touch display substrate, the touch electrodes are self-capacitance electrodes, and may be re-used as common electrodes. When the touch electrodes are re-used as the common electrodes, the structures of the touch display substrate can be simplified, and a thickness of the touch display substrate can be reduced.

Optionally, the method further includes: when the display device works in a display period, simultaneously supplying a common voltage signal to the touch electrodes and the conductive shield layer.

In this way, in the display period, the conductive shield layer can shield the electrical signals of the periphery wires and then prevent the electrical signals of the periphery wires from affecting the displaying.

Unless otherwise defined, any technical or scientific terms used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than being limited to physical or mechanical connection. Such words as "on/above", "under/below", "left" and "right" are merely used to represent relative position relationship, and when an absolute position of an object is changed, the relative position relationship will be changed too.

The above are merely the optional embodiments of the present disclosure and shall not be used to limit the scope of the present disclosure. It should be noted that, a person skilled in the art may make improvements and modifications without departing from the principle of the present disclosure, and these improvements and modifications shall also fall within the scope of the present disclosure.

What is claimed is:

1. A touch display substrate comprising:
a touch region;
a non-touch region;
a plurality of touch electrodes at the touch region;
periphery wires at the non-touch region; and
a conductive shield layer covering one side of all the periphery wires away from the touch display substrate;
wherein an orthographic projection of the conductive shield layer to the touch display substrate and an orthographic projection of all the periphery wires to the touch display substrate at least partially overlap with each other;
the conductive shield layer and the touch electrodes are within an identical layer, made of a same material and formed simultaneously by using an exposure and development process;
the touch display substrate further comprises a driver chip at the non-touch region; wherein the driver chip is coupled to the conductive shield layer to supply a touch drive signal or a common voltage signal to the conductive shield layer;
wherein the orthographic projection of all the periphery wires to the touch display substrate is completely within the orthographic projection of the conductive shield layer to the touch display substrate.

2. The touch display substrate of claim 1, further comprising an insulation layer between the conductive shield layer and the periphery wires.

3. The touch display substrate of claim 1, wherein the conductive shield layer is spaced from the touch electrodes.

4. The touch display substrate of claim 1, wherein the conductive shield layer extends along a periphery of the touch electrodes, and defines a U-shape.

5. The touch display substrate of claim 4, wherein the touch electrodes are within the U-shape defined by the conductive shield layer.

6. A display device comprising the touch display substrate of claim 1.

7. The display device of claim 6, further comprising a color substrate that is arranged opposite to the touch display substrate; wherein the color substrate comprises a base substrate, a black matrix at the base substrate and a color filter unit; there is an overlapping region between an orthographic projection of the black matrix to the base substrate and an orthographic projection of the periphery wires to the base substrate; and an orthographic projection of the conductive shield layer to the base substrate covers the whole overlapping region.

8. The display device of claim 6, further comprising a driver chip at the non-touch region; wherein the conductive shield layer is coupled to the driver chip.

9. The display device of claim 6, further comprising an insulation layer between the conductive shield layer and the periphery wires.

10. The display device of claim 6, wherein the conductive shield layer and the touch electrodes are within an identical layer, and the conductive shield layer is spaced from the touch electrodes.

11. The display device of claim 6, wherein the conductive shield layer extends along a periphery of the touch electrodes, and defines a U-shape.

12. The display device of claim 6, wherein the touch electrodes are within the U-shape defined by the conductive shield layer.

13. A method for driving the display device of claim 6, comprising:
simultaneously supplying a touch drive signal to the touch electrodes and the conductive shield layer when the display device works in a touch period.

14. The method of claim 13, further comprising: simultaneously supplying a common voltage signal to the touch electrodes and the conductive shield layer when the display device works in a display period.

15. A method for manufacturing a touch display substrate that comprises a touch region, a non-touch region, a plurality of touch electrodes at the touch region, periphery wires at the non-touch region and a driver chip at the non-touch region, the method comprising: forming a conductive shield layer covering one side of all the periphery wires away from the touch display substrate, wherein an orthographic projection of the conductive shield layer to the touch display substrate and an orthographic projection of all the periphery wires to the touch display substrate at least partially overlap with each other; the driver chip is coupled to the conductive shield layer to supply a touch drive signal or a common voltage signal to the conductive shield layer;

wherein the forming the conductive shield layer covering one side of all the periphery wires away from the touch display substrate comprises: forming the conductive shield layer and the touch electrodes simultaneously through an exposure and development process, and wherein the orthographic projection of all the periphery wires to the touch display substrate is completely within the orthographic projection of the conductive shield layer to the touch display substrate.

16. The method of claim 15, wherein before the forming a conductive shield layer covering one side of all the periphery wires away from the touch display substrate, the method further comprises: forming an insulation layer covering the periphery wires; and the forming a conductive shield layer covering one side of all the periphery wires away from the touch display substrate comprises: forming the conductive shield layer and the touch electrodes at the insulation layer.

* * * * *